Dec. 17, 1968 C. TONDATO 3,416,783
RUBBER-METAL SPRING DEVICE
Filed Sept. 26, 1966 3 Sheets-Sheet 2
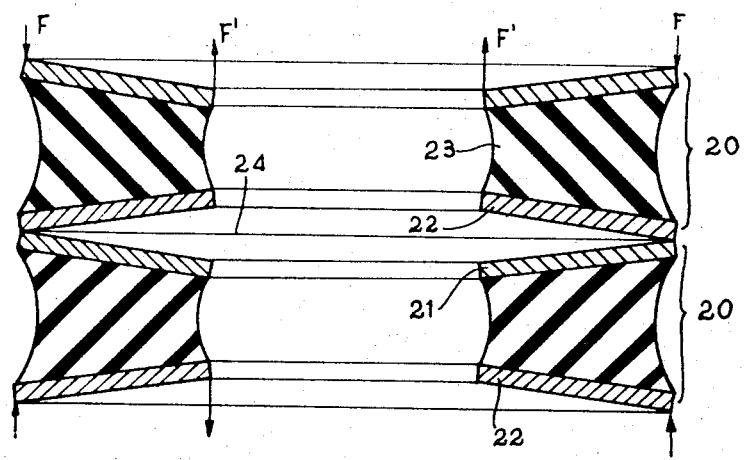
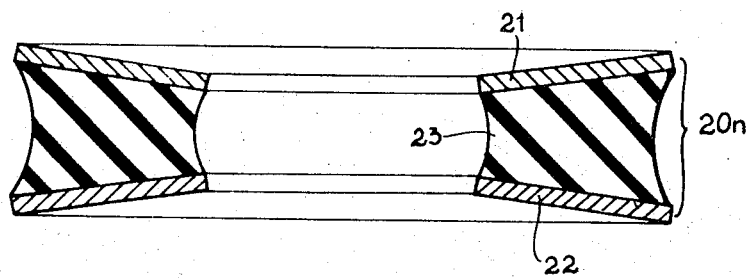

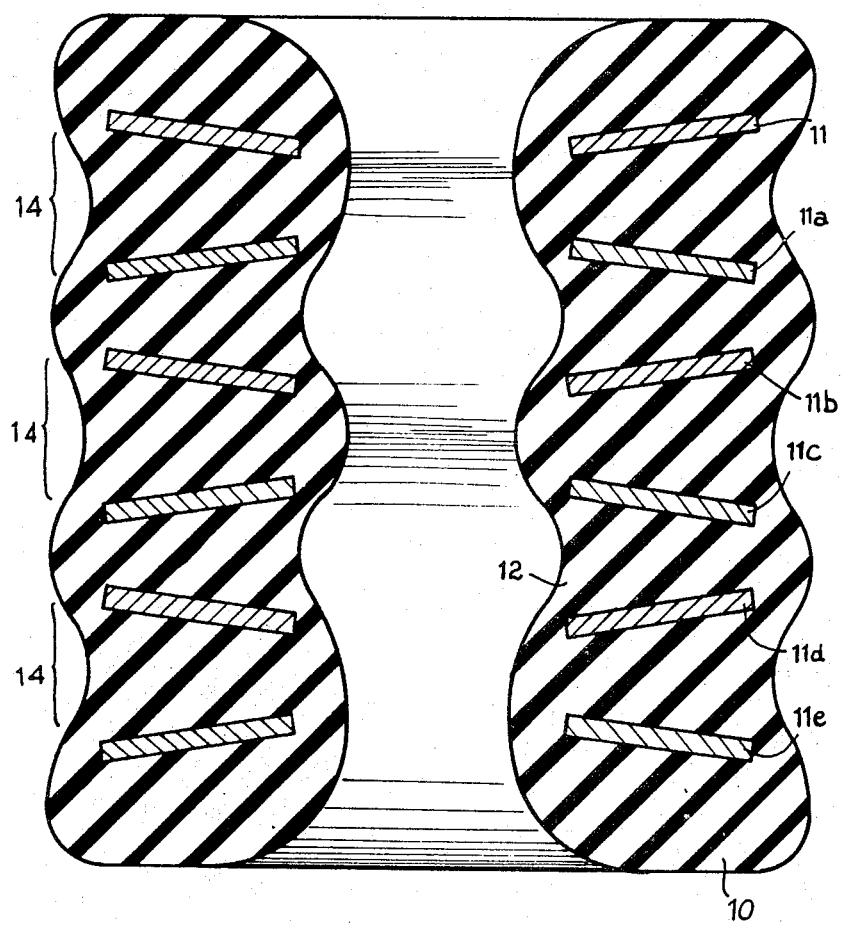

Dec. 17, 1968    C. TONDATO    3,416,783
RUBBER-METAL SPRING DEVICE
Filed Sept. 26, 1966    3 Sheets-Sheet 3

États-Unis Patent Office 3,416,783
Patented Dec. 17, 1968

3,416,783
RUBBER-METAL SPRING DEVICE
Carlo Tondato, Turin, Italy, assignor to
Firgat S.n.c., Turin, Italy
Filed Sept. 26, 1966, Ser. No. 581,878
Claims priority, application Italy, Nov. 19, 1965,
26,247/65
7 Claims. (Cl. 267—33)

ABSTRACT OF THE DISCLOSURE

A compression spring of composite rubber and metal is formed of at least one spring element having a pair of dished metal spring members oppositely positioned with their convex faces adjacent and a rubber spring component bonded to the convex faces so that compression loading forces are transmitted from one spring to the other exclusively through the rubber spring and these forces tend to flatten the metal spring members which operate on a range such that they are never completely flattened. The spring members may be coaxial discs or flat leaves. There may be a number of elements which are completely embedded in rubber or a number of elements which transmit forces from one element to the opposite edge of another element without being embedded in rubber.

---

The invention relates to rubber-metal springs. Such springs are suitable for various uses, such as in suspension arrangements for vehicles and machine parts, and in antivibratory supports, limit pads, and buffers for rail vehicles. These examples are of course only intended as an indication of the type of use to which such springs may be put.

Rubber-metal springs can be viewed from two principal viewpoints, depending on the basic component of the spring. In springs in which the basic component is metal, the use of rubber in association with the metal component is mainly due to the necessity of dissipating the deformation of the spring and this is done by taking advantage of the hysteresis of the purposely added rubber component. Moreover, a metal spring is almost always subject to the effect of vibrations. Usually, such vibrations are undesirably transmitted to the structures against which the spring abuts, or if such transmission is limited by the interposition of arresting members for cutting down the vibrations, they may be a cause of fatigue of the spring and possibly lead to breakage thereof. In such a case a rubber lining on the metal spring is useful for damping the vibrations of the latter, and avoiding breakage by fatigue.

If a rubber component is used as basic part, the addition of the metal component is mainly for one or both of the following reasons:

(a) Stabilization of the rubber spring or improvement of its form coefficient, (b) modification of its characteristic curve.

Metal helical springs are known which have their turns lined with rubber or embedded in a cylindrical solid body of rubber. Rubber springs stressed by compression are also known, these being subdivided along their length into sections by the interposition of flat metal discs or the like.

The prior art does not however seem to have seriously considered the following further aspects of the problems encountered. For instance, when a metal spring is embedded in rubber, it acts as a path for the transmission of vibrations, more particularly at audible or higher frequencies. Such transmission is between the suspended and unsuspended mass unless bearing and connecting members are additionally employed capable of limiting propagation of the vibrations. This is not always easy, convenient or economic. In such cases it would be normal to employ rubber springs. This is sometimes easy, for instance in the case of substitution for a helical spring, but at other times is impossible, for instance in the case of substitution for a leaf or semielliptical metal spring. It is found that in use a rubber spring undergoes permanent deformations which are often considerable and excessive; deformation is avoided only where in addition a metal spring acts between the suspended and unsuspended mass. However, this automatically introduces into the system the previously mentioned and undesirable vibration transmission path. Furthermore, and although rubber-metal springs comprising a pile of rubber rings alternating with metal discs are highly effective in preventing propagation of vibrations and are capable of dissipating appreciable work of deformation, their tendency towards considerable permanent deformation prevents their use in many cases.

The present invention has for its main object the provision of rubber-metal springs substantially free from the above mentioned disadvantages.

More particularly, the invention has for its object the provision of rubber-metal springs which combine a reduced tendency to permanent deformation with a reduced tendency to propagate vibrations.

A further object of the invention is to provide a composite rubber-metal spring device comprising at least one spring element formed from two metal spring members, separated by a rubber spring part in such an arrangement that loading forces on the device are transmited from one member of, or each element to the other member thereof exclusively through the said rubber part.

The metal spring members may be in the form of elementary springs of various types; however, springs having an extensive load-transmitting surface are preferred, such as leaf springs, leaves of composite semi-elliptical springs, cup or dish springs. The use of such spring members affords an extensive contact with the rubber part separating them. However, it should be understood that the invention also covers rubber-metal springs comprising metal spring members having relatively restricted load-transmitting surfaces. This is particularly so when the said surfaces are effectively extended by providing them with rigid load-distributing members, such as discs or plates, interposed between the said metal members and the rubber part.

These and other objects and advantages of the invention will be clear from the following description, given with reference to the accompanying drawings, which are by way of example, and in which:

FIGURE 1 shows a spring according to the invention in axial section,

FIGURE 2 shows a modified spring in axial section,

Figure 3:
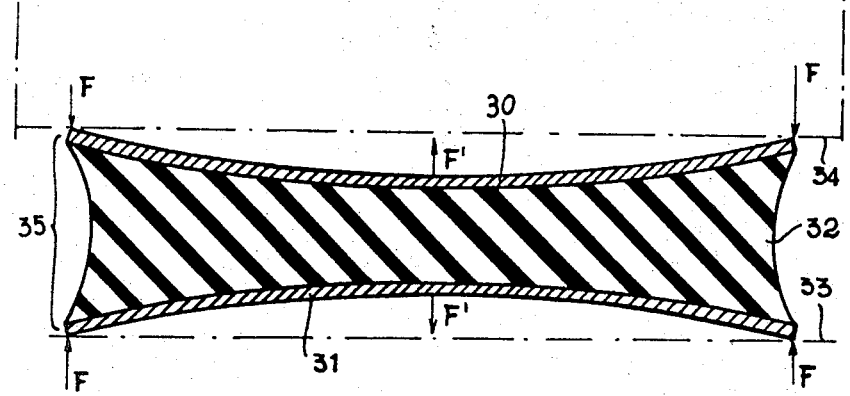
FIGURE 3 shows a further type of spring according to the invention in axial section.

The spring device shown in FIG. 1 comprises a tubular rubber body 10 intended for submission to axial compression stresses, and having embedded in it a coaxial set of dished disc-shaped metal spring members 11, 11a . . . 11e. The dished metal springs are arranged in pairs with their apices directed together and separated from one another by portions 12 of the rubber body 10. Each pair of spring members is regarded as constituting a spring element 14. It will be readily seen from the illustrated arrangement that the metal members 11 . . . 11e transmit the compressive deformation loads from one to the other through the rubber parts 12 and without any direct physical contact between metal members. In this way, the propagation of vibrations from one spring end to the other is prevented.

The members 11 . . . 11e additionally contribute to the elastic characteristics of the spring, inasmuch as they operate under load in the manner known per se of the dish or cup spring, and gradually move from their original dished shape into a flat configuration. On removal of the loading forces, the spontaneous return of the members 11 ... 11e to their initial dished configuration to a certain extent prevents permanent deformation of the rubber parts 12 by applying an axial extension force to those sections of the said parts 12 which are crushed by the movement of the resilient deformation of the metal members under load.

The outer and inner surfaces of the rubber body 10 may be truly cylindrical or they may adopt a corrugated form, as shown in FIG. 1. This is in fact preferred, the concave and convex sections being located respectively at the maximum and minimum spacing of the metal members in each element pair so as to relieve the rubber under increasing loads and to avoid stripping of the rubber from the metal members.

The resilient characteristics of the metal members and interposed rubber parts can be chosen to suit particular requirements. Experiments have shown that it would not be convenient to employ metal members which are more rigid under load than their adjacent rubber parts. In other words, it would seem convenient for the flexibility of the members to be such that deformation of the rubber part interposed between two members always occurs simultaneously with a resilient deformation of the said members. This means that the overall flexibility of the two members in each element pair 11–11a, 11a–11b ... 11d–11e should exceed the flexibility of the interposed rubber parts. On reduction of the load the dishing of each of the two said members will slightly increase, and this will result in axial extension of the crushed sections and corresponding expansion of the sandwiched rubber parts.

The spring device shown in FIG. 2 comprises a coaxial pile of a number of separate rubber-metal spring elements 20, 20a ... 20n. The spring elements each comprise a pair of dished metal spring members 21, 22 spaced by an annular rubber part 23. As in the spring of FIG. 1 the apices of each metal spring pair are directed together.

In the structure shown, transmission of a loading force from one spring element to another is effected by direct contact of the circumferential outer edges of each spring member 22 with the circumferential outer edges of an adjacent spring member 21 forming a part of the adjacent element. The transmission between elements is thus effected without the interposition of any rubber part. The transmission of load forces through each individual spring element 20 ... 20n, however, involves the interposed rubber parts 23. Suitable centering means (not shown) may be provided on the spring members 21, 22 to ensure coaxial alignment of the various elements.

The same considerations set out above with reference to FIG. 1 and concerning the choice of suitable elastic characteristics apply of course also to this construction. It will, however, be readily seen that with the absence of rubber parts between some of the metal springs, the permanent deformation of the device as a whole is appreciably reduced with respect to the spring device shown in FIG. 1.

In both the constructions described above the spring metal members can take any of the geometrical forms previously known in dish or cup spring techniques. These forms can include, for instance, the provision of indentations or corrugations, in order to improve the flexibility of the elements under load or to modify their characteristic curve.

Moreover, the profile of the rubber parts 12, 13 can be modified according to particular requirements.

The construction shown in FIG. 2 is also highly advantageous from the point of view of dispersion of the hysteresis heat through the air pumping action which results in operation. This pumping action is effective on the air held in the clearances 24 formed between the individual elements 20 ... 20n.

Figure 4:
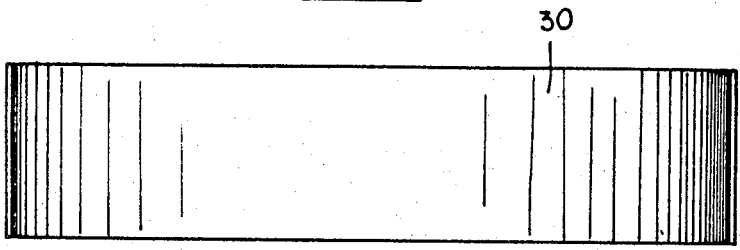
FIGURE 4 shows the spring in FIG. 3 in plan view.

In the construction illustrated in FIGS. 3 and 4 the two metal spring members 30, 31 each comprise a rectangular leaf spring with a semi-elliptical curvature. The rear face of one spring member 30 or 31 is turned towards the rear face of the other spring and a rubber part 32 is sandwiched between the springs and vulcanized to their juxtaposed faces. The resulting spring element 35 takes the form of a resilient pad suitable for interposition between a flat base surface 33 and a flat surface 34 associated with the mass to be sprung.

In operation and under load the members 30, 31 are subjected to bending stresses, the rubber part 32 being mainly subjected to compression stresses. As will be obvious, a plurality of elements 35 can be stacked one upon another, similarly to the construction shown in FIG. 2. In this case, also the spring members 30, 31 are advantageously formed to be more flexible than the rubber part 32 in order to counteract in part the permanent deformation of the latter.

A particularly advantageous aspect of the rubber-metal springs described is that under increasing loads certain regions of the metal members yield in the direction of the load forces, whereas other regions undergo displacement in an opposite direction. Thus, for instance, in FIG. 3 the ends of the members 30, 31 yield in the direction F at the same time as opposite displacements F' occur in their middle regions. This is also indicated in FIG. 2, and means that under increasing loads a centripetal flow of the rubber takes place. This flow is forcibly reversed on cessation of the load owing to the tendency of the metal members to resume their original shape. Consequently most of the permanent deformation of the rubber part is neutralized and, additionally, the rubber works under better conditions than has previously been the case.

What I claim is:

1. A composite rubber-metal compression spring device comprising; at least one spring element formed from a pair of dished metal spring members oppositely positioned with a convex face of one dished spring member facing a convex face of the other dished spring member and a rubber spring part bonded to at least the facing convex faces of the pair of dished spring members, the rubber spring part separating the pair of metal spring members so that compressive loading forces transmit from one of the spring members to the other spring member are transmitted exclusively by the rubber part, and these compressive forces tend to flatten the metal spring members, the spring element operating at a low range so that the dished metal spring members are never completely flattened.

2. A spring device as in claim 1 wherein the dished spring members are in the form of dished coaxially positioned discs.

3. A spring device as in claim 1 wherein the dished spring members are dished aligned leaves.

4. A spring device as in claim 1 wherein the spring element is totally embedded in rubber, and a portion of the rubber constitutes the rubber spring part bonded to the facing convex faces of the pair of dished metal spring members.

5. A spring device as in claim 1 including a plurality of aligned spring elements, a dished spring member of one of the spring elements transmitting compressive loading forces to a dished metal spring member of another of the elements through rubber in which both of the aligned spring elements are embedded.

6. A spring device as in claim 1 comprising a plurality of like aligned spring elements, a dished metal spring member of one spring element transmitting compressive loading forces to a dished metal spring member of another spring element only at an outer edge thereof without the spring elements being embedded in rubber.

7. A spring device as in claim 1 wherein the overall flexibility of the two dish metal spring members of the spring element is greater than the flexibility of the rubber spring part bonded to and between the metal spring elements.

(References on following page)

References Cited

UNITED STATES PATENTS

| | | | |
|---|---|---|---|
| 2,713,483 | 7/1955 | Tillou | 267—1 |
| 2,889,056 | 6/1959 | Blattner | 267—1 X |
| 3,079,277 | 2/1963 | Painter. | |
| 3,134,585 | 5/1964 | Trask | 267—1 |

FOREIGN PATENTS

| | | |
|---|---|---|
| 187,028 | 12/1963 | Sweden. |
| 373,926 | 1/1964 | Switzerland. |
| 497,008 | 12/1938 | Great Britain. |
| 497,051 | 12/1938 | Great Britain. |
| 816,042 | 7/1959 | Great Britain. |
| 1,261,083 | 4/1961 | France. |

DRAYTON E. HOFFMAN, *Primary Examiner.*

STANLLY T. KRAWCZEWICZ, *Assistant Examiner.*

U.S. Cl. X.R.

267—1; 213—40